United States Patent
Meerdink et al.

(10) Patent No.: US 12,193,448 B2
(45) Date of Patent: Jan. 14, 2025

(54) SKINNING DEVICE FOR REMOVING SKIN FROM AN ANIMAL CARCASS WHEN CONVEYED BY A CONVEYOR MEANS

(71) Applicant: MAREL MEAT B.V., Boxmeer (NL)

(72) Inventors: Jan Johannes Meerdink, Boxmeer (NL); Franciscus Theodorus Henricus Johannes Van Der Steen, Boxmeer (NL); Frank Van Happen, Boxmeer (NL)

(73) Assignee: MAREL MEAT B.V., Boxmeer (NL)

( * ) Notice: Subject to any disclaimer, the term of this patent is extended or adjusted under 35 U.S.C. 154(b) by 77 days.

(21) Appl. No.: 18/253,654

(22) PCT Filed: Nov. 25, 2021

(86) PCT No.: PCT/EP2021/083044
§ 371 (c)(1),
(2) Date: May 19, 2023

(87) PCT Pub. No.: WO2022/112443
PCT Pub. Date: Jun. 2, 2022

(65) Prior Publication Data
US 2024/0000087 A1 Jan. 4, 2024

(30) Foreign Application Priority Data
Nov. 27, 2020 (EP) .................................... 20210440

(51) Int. Cl.
*A22B 5/00* (2006.01)
*A22B 5/16* (2006.01)
(Continued)

(52) U.S. Cl.
CPC ............ *A22B 5/161* (2013.01); *A22C 15/001* (2013.01); *A22C 17/12* (2013.01)

(58) Field of Classification Search
CPC ....... A22B 5/161; A22C 15/001; A22C 17/12; A22C 21/0092
(Continued)

(56) References Cited

U.S. PATENT DOCUMENTS

| 4,327,633 A | 5/1982 | Leining et al. |
| 4,433,453 A | 2/1984 | Leining et al. |

(Continued)

FOREIGN PATENT DOCUMENTS

| EP | 0064109 A1 | 11/1982 |
| EP | 2018809 A1 | 1/2009 |

(Continued)

OTHER PUBLICATIONS

International Search Report from corresponding PCT Application No. PCT/EP2021/083044, Feb. 25, 2022.

(Continued)

*Primary Examiner* — Richard T Price, Jr.
(74) *Attorney, Agent, or Firm* — Workman Nydegger (57) ABSTRACT

A system and a method are provided for deskinning and/or defatting animal carcass while being conveyed by an overhang rails system carrying the carcass. The method includes: sensing, by a sensing device, an incoming animal carcass, using the resulting sensing data from the sensing device by a control unit in controlling a movement of a first device while deskinning and/or defatting the carcass by the first device. The controlled movement includes: setting the first device to an initial angular position and engaging the skin and/or fat of the incoming animal carcass at an engaging position; moving the first device in a movement direction including a movement direction perpendicular to the conveying direction along the animal carcass while following an outer profile of the surface of the carcass and simultaneously (Continued)

adapting the angular position of the first device to the shape of the carcass for partial removal of skin or fat.

15 Claims, 4 Drawing Sheets

(51) Int. Cl.
*A22C 15/00* (2006.01)
*A22C 17/12* (2006.01)

(58) Field of Classification Search
USPC .......................................................... 452/149
See application file for complete search history.

(56) References Cited

U.S. PATENT DOCUMENTS

| | | | |
|---|---|---|---|
| 5,279,518 A * | 1/1994 | Ekiss | A22B 5/161 |
| | | | 452/128 |
| 5,336,124 A * | 8/1994 | Garside | A22B 5/161 |
| | | | 452/187 |
| 2005/0176357 A1 | 8/2005 | Ilch et al. | |
| 2006/0019590 A1 | 1/2006 | Ilch et al. | |

FOREIGN PATENT DOCUMENTS

| | | | |
|---|---|---|---|
| EP | 3051955 A1 | 8/2016 | |
| EP | 3485735 A1 | 5/2019 | |
| GB | 2233541 A | 1/1991 | |

OTHER PUBLICATIONS

Extended European Search Report from corresponding EP Application No. 20210440.2, May 27, 2021.

* cited by examiner

SKINNING DEVICE FOR REMOVING SKIN FROM AN ANIMAL CARCASS WHEN CONVEYED BY A CONVEYOR MEANS

FIELD OF THE INVENTION

The present invention relates to a skinning device for removing skin or fat layers from an animal carcass when conveyed by a conveyor means, and to a method of doing the same using such a skinning device.

BACKGROUND OF THE INVENTION

Skinning device for removing skin or fat layers from an animal carcass, in particular pork, is one of the challenges within the field of meat processing.

Considerable development has been made in the last decades within this field where skinners such as the one disclosed in EP14780522.0 which relates to a skinning device rotatable mounted to a rotation mechanism for automatically removing skin from an animal carcass while it is conveyed by an overhang rail system and pulled in a horizontal direction over the skinning device. During the skinning process, the rotation mechanism rotates the skinning device from a first angular position, where the skinning device engages the skin of the incoming carcass, to a second angular position, while the carcass lies on the skinner and is pulled in a horizontal direction by the overhang rail system. This results in that the skin of only one side of the carcass is removed.

Although this skinner is an improvement over prior art skinners, in addition to the remaining skin that is not removed, there is still a significant part of skin that it is not possible to remove, especially skin that is less exposed. This skin therefore needs to be removed manually by an operator. This not only reduces the throughput of the skinning process, but also jeopardises the safety of the skinning operation due to the relatively large amount of manual labour needed to complete the deskinning process.

The inventor of the present invention has appreciated that there is thus a need for an improved skinning process that provides higher throughput and significantly reduces the manual labor and has in consequence devised the present invention.

SUMMARY OF THE INVENTION

It is an object of embodiments of the invention to provide an improved skinning process that increases the throughput of the skinning process and which no longer require manual interference or at least reduces the need of manual labor work. It is a further object of embodiments of the invention to provide a skinning device. In general, the invention preferably seeks to mitigate, alleviate or eliminate one or more of the above-mentioned disadvantages of the prior art singly or in any combination. In particular, it may be seen as an object of embodiments of the present invention to provide a skinning system that solves the above-mentioned problems, or other problems.

To better address one or more of these concerns, in a first aspect of the invention a deskinning and/or defatting system is provided for removing skin and/or fat from animal carcass while being conveyed by an overhang rails system comprising multiple of shackles carrying the carcass, comprising:
    a first device for deskinning and/or defatting the carcass, comprising—
        a first motor driven tooth roll,
        a first support structure encasing at least a portion of the first tooth roll, and
        a first cutting blade positioned between the support structure and the tooth roll,
    a sensing device for sensing an incoming carcass,
    a control unit for receiving sensing data from the sensing device,
    a moving mechanism controlled by the control unit based on the received sensing data configured for moving the first device in a controlled manner,
    wherein the controlled movement comprises:
        setting the first device to an initial angular position and engaging the skin and/or fat of the incoming carcass at an engaging position where the skin and/or fat layer is pulled between the first support structure and the first tooth roll,
        moving the first device in a movement direction including a movement direction perpendicular to the conveying direction along the carcass while following an outer profile of the surface of the carcass and simultaneously adapting the angular position of the first device to the shape of the carcass so as to ensure that the skin and/or fat part is pulled between the first support structure and the first tooth roll causing simultaneous partial removal of the skin and/or fat from the animal carcass.

The fact that it is the first automated device that is moving relative to the carcass while deskinning and/or defatting facilitates accessing less exposed or "difficult" areas on the surface of the carcass and thus ensure that the whole deskinning area covered by the first device is removed. The fact that the carcass is carried by a shackle means it may be partially or preferably completely freely hanging so that the whole surface of the carcass is exposed means a complete accessibility to the outer surface of the carcass (front side, back side, inside and outside of the carcass). This results thus in that the skinning process may be repeated at different areas several times until the whole skin and/or fat has been removed. This may as an example be done by adjusting the relative angular position between the first device and the carcass, e.g. rotating the shackle and/or rotating the position of the first device.

Preferably, a support means, such as any type of structure on the opposite side of the carcass is provided to ensure proper stability of the carcass during the deskinning and/or defatting process.

Moreover, the fact that less or no manpower is needed makes the deskinning and/or defatting process more economical and accidents become negligible.

The term animal carcass may according to the present invention also be understood as animal carcass part, such as from slaughtered pigs, a half carcass, leg parts, hams, and shoulder parts of pigs, or any other parts of slaughtered four-legged animals.

In one embodiment, the control unit is further configured to control the rotational speed of the first motor driven tooth roll including setting it to an initial rotational speed and subsequently gradually adapting the rotational speed to the position on the carcass, e.g. increasing the rotational speed, decreasing the rotational speed, or keeping it constant. Having the initial speed of first motor driven tooth roll lower facilitates the initial capture of the skin, which thus ensures subsequent deskinning and/or defatting of the carcass. In one embodiment, the control unit is further configured to adjust the rotational speed in dependence of the position of the first device. The subsequent movement of the first device can thus be increased and therefore the throughput of the deskinning and/or defatting process.

In one embodiment, the system further comprises a support structure position on opposite side of the carcass to the first device for providing a force opposite to the pushing force supplied by the first device during the deskinning and/or defatting. A full stability of the carcass is thus ensured during the skinning which improves the deskinning and/or the defatting process.

In one embodiment, the system further comprises a second device for deskinning and/or defatting the carcass, comprising:
- a second motor driven tooth roll,
- a second support structure encasing at least a portion of the second tooth roll, and
- a second cutting blade positioned between the support structure and the second tooth roll wherein the moving mechanism is further configured to move the first and the second device while simultaneously de-skinning and/or de-fatting different areas on the carcass, where the internal distance between the first and the second skinning device is such that the carcass is clamped between the skinning devices. Thus, not only is the throughput of the deskinning and/or defatting process increased, but also, it is ensured that the carcass is stable during the deskinning and/or defatting process increased. The second device may accordingly also be considered as said support structure.

In one embodiment, the first device and the support structure move with an appropriate moving mechanism at a horizontal speed being essentially the same as the conveying speed of the carcass. In case of the support structure comprising the second device, the first and the second device move parallel to movement of the carcass at the same horizontal speed during the deskinning and/or defatting process, where after finalizing one movement from e.g. moving from up to down on the carcass, the move away from the carcass back to the starting position where the deskinning and/or defatting process is repeated for the subsequent carcass.

In one embodiment, the moving mechanism comprises at least one manipulation arm, which may as an example be a robotic arm operated by a robotic system moveable along e.g. three degrees of freedom and even up to six degrees of freedom, where the control unit may be a part of the robotic system. In another embodiment, the moving mechanism comprises a rail structure to which the device for deskinning and/or defatting is slideable attached to the rail structure. The moving mechanism may accordingly be understood as any kind of a moving means that is capable of performing said controlled movement of the first device.

In one embodiment, the control unit is further configured to utilize further data indicating what parts of skin and/or fat is to be removed. This may be based on customer orders, where as an example a middle part of a carcass in e.g. a certain batch is to be left with a skin, while deskinning the remaining part, or deskin and/or defat only lower part of the carcass, or only one side of the carcass. This might also be decided based information of incoming carcasses that are preferably tracked and/or traced at all times, so that for certain carcasses having certain characteristics that may be captured by any type of a sensor, such as images, colors, quality, sizes etc. may trigger different or additional control data in controlling the first and/or the second device.

In a second aspect of the invention, a method is provided for deskinning and/or defatting animal carcass while being conveyed by an overhang rails system comprising multiple of shackles carrying the carcass, the method comprising:

sensing, by a sensing device, an incoming animal carcass, using the resulting sensing data from the sensing device by a control unit as a controlling data in controlling a movement of a first device while deskinning and/or defatting the carcass by the first device, where the controlled movement comprises:
  setting the first device to an initial angular position and engaging the skin and/or fat of the incoming animal carcass at an engaging position,
  moving the first device in a movement direction including a movement direction perpendicular to the conveying direction along the animal carcass while following an outer profile of the surface of the carcass and simultaneously adapting the angular position of the first device to the shape of the carcass so as to ensure a partial removal of the skin and/or fat.

In an embodiment, the carcass has a pre-cut at an upper side of the carcass defining the engaging position, and where the moving direction perpendicular to the conveying direction is a direction downward from the pre-cut.

In an embodiment, a second device for deskinning and/or defatting is provided for partial deskinning and/or defatting of the carcass simultaneous to the partial deskinning and/or defatting of the first device, where simultaneous to the first device, the controlled movement further includes:
  setting the second skinning device to an initial angular position and engaging the skin and/or fat of the incoming animal carcass at an engaging position,
  moving the second skinning device in a movement direction including a movement direction perpendicular to the conveying direction of the animal carcass while following an outer profile of the surface of the carcass while simultaneously adapting the angular position of the second skinning device to the outer shape of the carcass so as to ensure a partial removal of skin and/or fat,
wherein the movement of the first and the second skinning device is continued while the internal distance between the first and the second skinning device is such that the carcass is clamped between the skinning devices during the deskinning and/or defatting. The engaging position of the second device is in one embodiment at a same height level as the engaging position of the first device. In another embodiment, the engaging position of the second device is at a different height level as the engaging position of the first device.

In one embodiment, subsequent to a first movement of the first and the second device, a subsequent movement of deskinning and/or defatting is performed on the carcass at a different angular position on the carcass.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
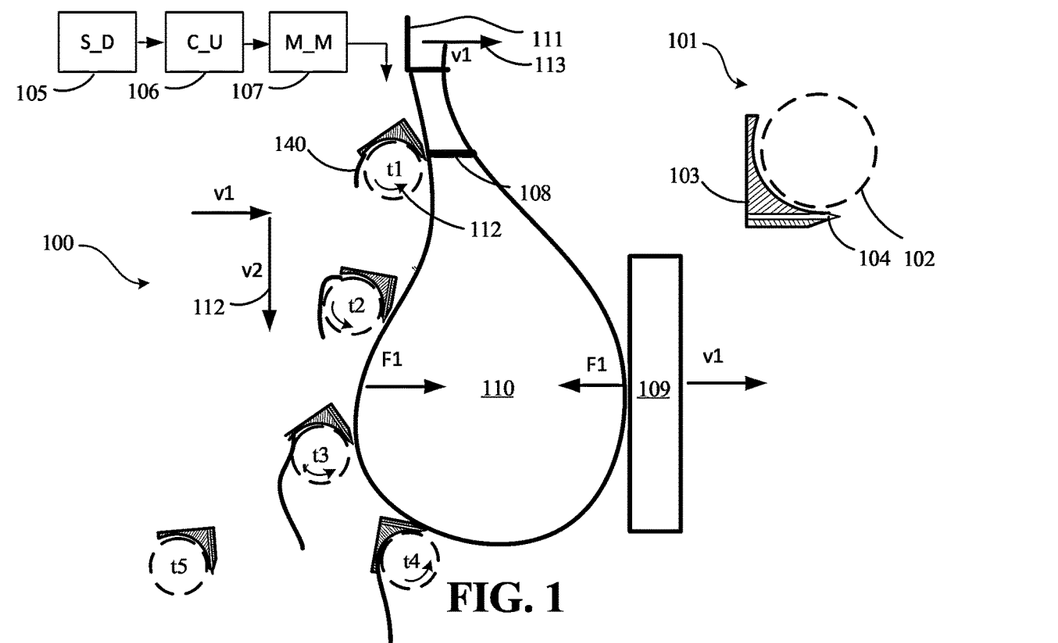
FIG. 1 depicts an embodiment of a deskinning and/or defatting system according to the present invention for removing skin and/or fat from animal carcass while being conveyed by an overhang rails system.

FIG. 1 depicts an embodiment of a deskinning and/or defatting system 100 according to the present invention for removing skin and/or fat from animal carcass 110 while being conveyed by an overhang rails system comprising multiple of shackles 111 carrying the carcass. The system comprises a first device for deskinning and/or defatting the carcass 110, a sensing device (S_D) 105, a control unit (C_U) 106 and a moving mechanism (M_M) 107.

The first device comprises a first motor driven tooth roll 102, a first support structure 103 encasing at least a portion of the first tooth roll, and a first cutting blade 104 positioned between the support structure and the tooth roll.

The sensing device 105 is configured to sense an incoming animal carcass, but this may comprise any type of a sensor, e.g. a camera, laser sensing device, a mechanical sensing device and the like.

The control unit 106 is configured to receive and utilize the sensing data from the sensing device and control the moving mechanism 107 for moving the first device in a controlled manner.

As illustrated here graphically, the controlled movement comprises setting the first device 101 to an initial angular position and engaging the skin and/or fat of the incoming animal carcass at an engaging position 108 where the skin and/or fat layer 140 is pulled between the first support structure and the first tooth roll via the rotational movement 112 of the first tooth roll. This engaging position may be a pre-cut, e.g. a 360 degrees pre-cut at an upper side of the carcass 110 adjacent to the shackle 111.

The controlled movement further comprises moving the first device in a movement direction including a movement direction 112 perpendicular to the conveying direction 113 along the animal carcass while following an outer profile of the surface of the carcass and simultaneously adapting the angular position of the first device to the shape of the carcass as illustrated in t1-t4 so as to ensure that the skin and/or fat part is pulled between the first support structure and the first tooth roll causing simultaneous partial removal of the skin and/or fat from the animal carcass.

In an embodiment, the control unit is further configured to control the rotational speed of the first motor driven tooth roll 102 including setting it to an initial rotational speed and subsequently gradually adapting the rotational speed. The control unit may further be configured to adjust the rotational speed in dependence of the position of the first device.

In the embodiment shown here, the system 100 further comprises a support structure 109 position on opposite side of the carcass 110 to the first device for providing a force opposite to the pushing force supplied by the first device during the deskinning and/or defatting.

After removing the skin and/or fat part 140, the first device 101 moves away from the carcass 110 (t5) and back to the original position where the process is repeated on e.g. a subsequent carcass.

Figure 2:
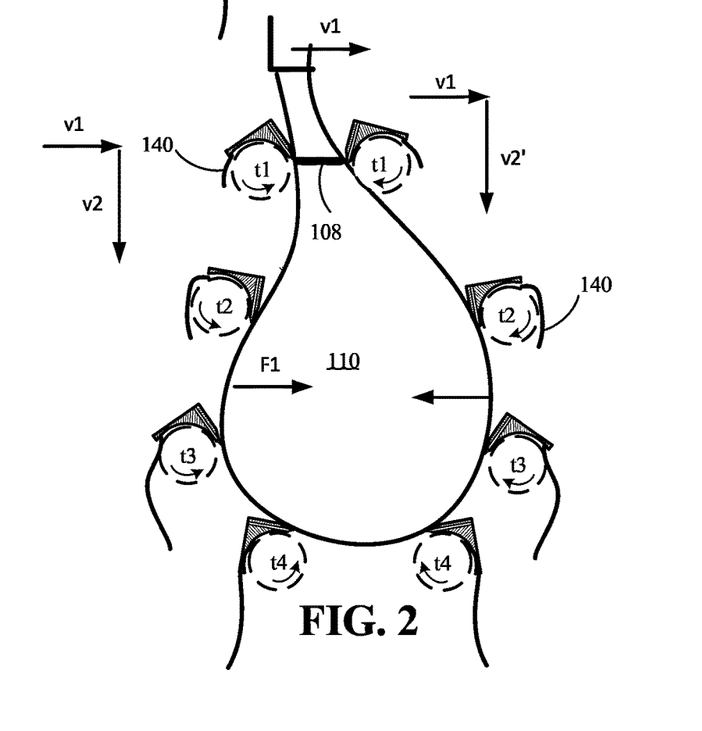
FIG. 2 shows another embodiment of FIG. 1, where additionally a second device for deskinning and/or defatting the carcass is provided.

FIG. 2 shows another embodiment of FIG. 1, where additionally a second device 201 for deskinning and/or defatting the carcass is provided, where this second device is preferably identical to the first device 101, where this second device comprises a second motor driven tooth roll, a second support structure encasing at least a portion of the second tooth roll, and a second cutting blade positioned between the support structure and the second tooth roll. In this embodiment, the moving mechanism 107 is further configured to move the first 101 and the second 102 device while simultaneously de-skinning and/or de-fatting different areas on the carcass, where the internal distance between the first and the second skinning device is such that the carcass is clamped between the skinning devices during the movement.

Moreover, this movement may be such that the height level is similar as shown, here, where the starting position is at the same or similar height levels. In such case, the height level during the movement from t1-t6 (this is of course a continuous movement, this illustrated different time points) is similar.

However, this starting position may not be the same and thus, the illustration shown here where the first and the second device are at a similar height level during the deskinning and/or defatting does not apply.

In FIGS. 1 and 2, the movement direction of the deskinning and/or defatting devices further includes a horizontal movement component that is the same as for the conveying direction of the carcass.

Figure 3:
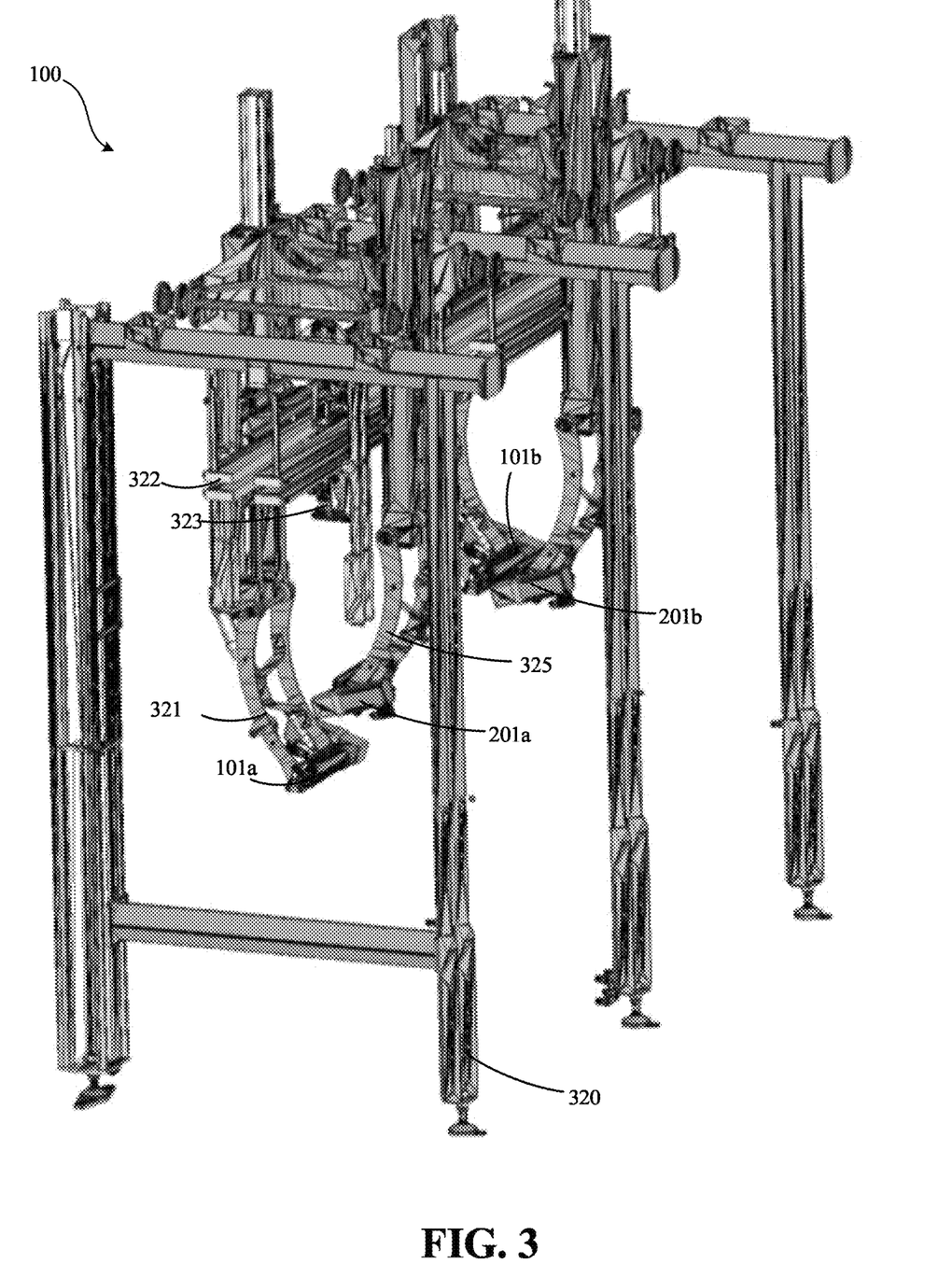
FIGS. 3 and 4 show another embodiment of a system according to the present invention showing frame structure.
Figure 4:
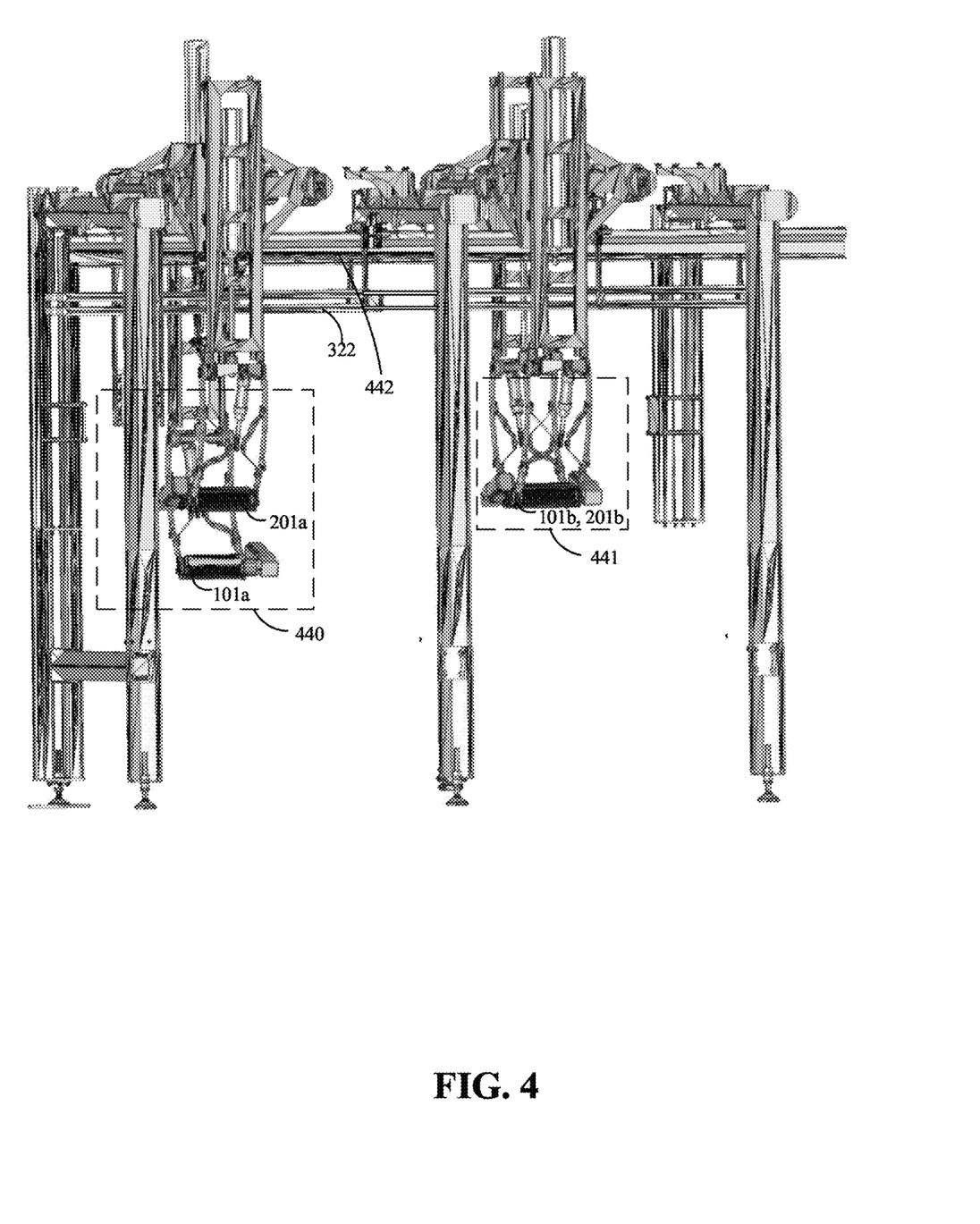
Figure 5:
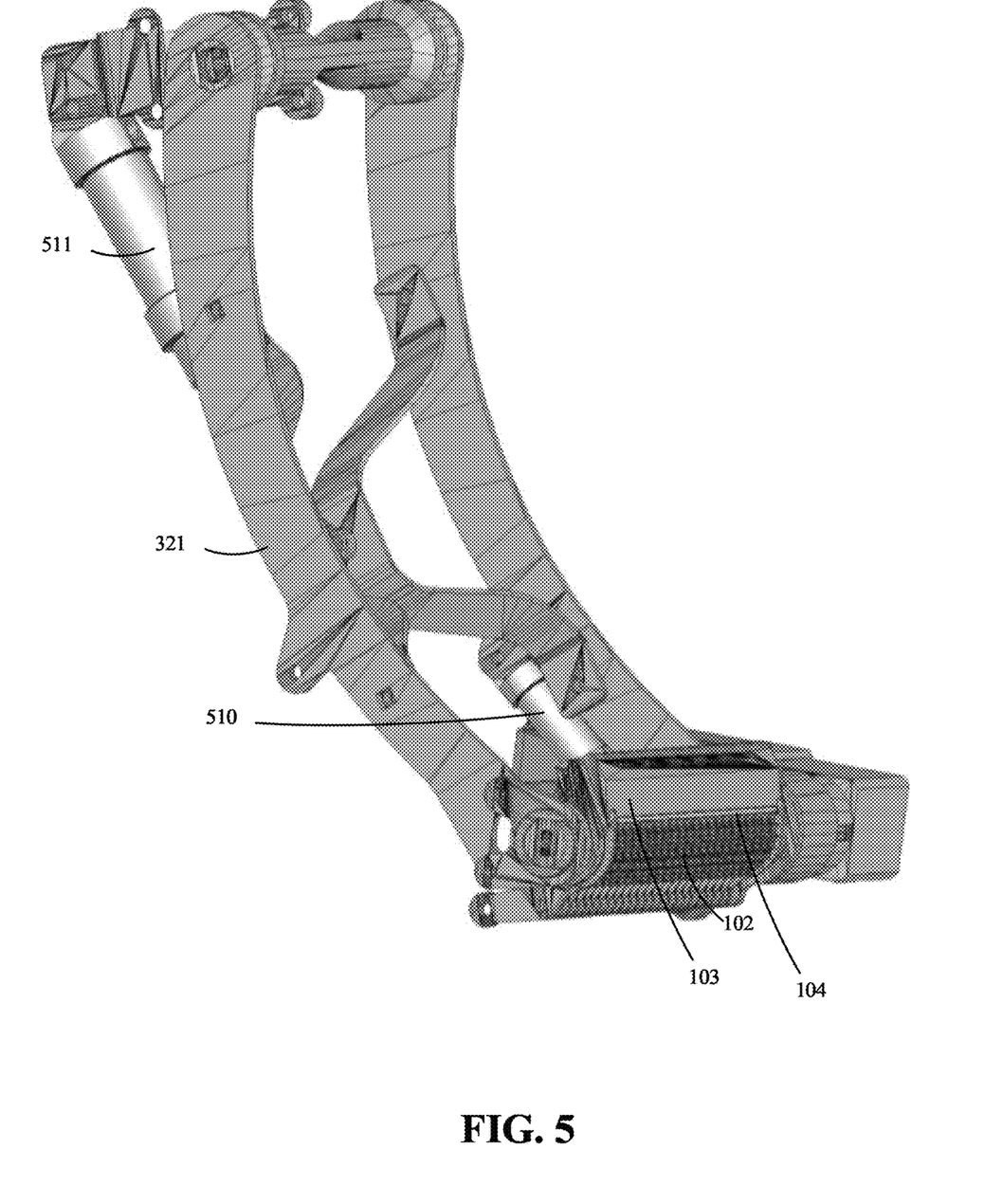
FIG. 5 shows an embodiment of a manipulation arm carrying a device for deskinning and/or defatting.

FIGS. 3 to 5 show another embodiment of a system according to the present invention showing frame structure, and an overhang rails system 322 attached to the frame structure showing a single shackle 323, showing two pairs 440, 441 of a first and second skinning devices, the first pair 440 being 101a, 102a, where the first movement occurs, such as one "stroke" as depicted in FIG. 2, and another pair 441 being 101b, 102b where a subsequent stroke occurs at a different position of the carcass, where this different position may be reached as an example via 90 degrees rotational movement of the shackle carrying the carcass.

The devices 101, 102 are mounted to a manipulation arms 321 which may be slideable attached to a rail structure 442 for allowing the devices for deskinning and/or defatting 101, 102 to follow the movement of the carcass during the skinning, as discussed previously in relation to FIGS. 1 and 2. The manipulation arm may also be a robotic arm to which the devices 101, 102 are attached to, where the robotic arm is operated by a robotic system.

As may be shown here, the internal height position of pair devices 440 is different from the height position of the pair devices 441, but this is because different skin and/or fat parts are being removed. If the carcass is carcass part such as ham, the skin of one side that is to be removed may be at a different position than the skin on the opposite side of the ham.

FIG. 5 shows a closer look at a manipulation arm shown in FIGS. 3 and 4, showing in more details the device for skinning and/or defatting comprising said motor driven tooth roll 102, said support structure 103 encasing at least a portion of the first tooth roll, and said cutting blade 104 positioned between the support structure and the tooth roll.

The moving mechanism comprises rotation device 510 for operating the angular adjustment of the device(s) 101/102 for deskinning and defatting may be electric or pneumatic driven, where via adjustment in the cylinder 510 the angular position of the devices 101, 102 is adjusted simultaneously.

The moving mechanism may also comprise an actuator 321, which similar to the rotation mechanism may be electric or pneumatic driven and allows the manipulation arm to follow the outer surface of the carcass during the deskinning and/or defatting.

As already addressed, the moving mechanism may also comprise a robotic arm moveable along three degrees of freedom and even up to six degrees of freedom.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A deskinning and/or defatting system for removing skin and/or fat from animal carcass while being conveyed by an overhang rails system comprising multiple of shackles carrying the carcass, comprising:
    a first device for deskinning and/or defatting the carcass, comprising,
    a first motor driven tooth roll,
    a first support structure encasing at least a portion of the first tooth roll, and
    a first cutting blade positioned between the support structure and the tooth roll,
    a sensing device for sensing an incoming animal carcass,
    a control unit for receiving sensing data from the sensing device,
    a moving mechanism controlled by the control unit based on the received sensing data configured for moving the first device in a controlled manner,
    wherein the controlled movement comprises:
    setting the first device to an initial angular position and engaging the skin and/or fat of the incoming animal carcass at an engaging position where the skin and/or fat layer is pulled between the first support structure and the first tooth roll,
    moving the first device in a movement direction including a movement direction perpendicular to the conveying direction along the animal carcass while following an outer profile of the surface of the carcass and simultaneously adapting the angular position of the first device to the shape of the carcass so as to ensure that the skin and/or fat part is pulled between the first support structure and the first tooth roll causing simultaneous partial removal of the skin and/or fat from the animal carcass.

2. The system according to claim 1, wherein the control unit is further configured to control the rotational speed of the first motor driven tooth roll including setting it to an initial rotational speed and subsequently gradually adapting the rotational speed.

3. The system according to claim 1, wherein the control unit is further configured to adjust the rotational speed in dependence of the position of the first device.

4. The system according to claim 1, further comprising a support structure position on opposite side of the carcass to the first device for providing a force opposite to the pushing force supplied by the first device during the deskinning and/or defatting.

5. The system according to claim 4, wherein during skinning the support structure, and/or first and the second device, is advanced with a speed essentially being the same as the conveying speed of the carcass.

6. The system according to claim 1, further comprising a second device for deskinning and/or defatting the carcass, comprising:
    a second motor driven tooth roll,
    a second support structure encasing at least a portion of the second tooth roll, and
    a second cutting blade positioned between the support structure and the second tooth roll,
    wherein the moving mechanism is further configured to move the first and the second device while simultaneously de-skinning and/or de-fatting different areas on the carcass,
    where the internal distance between the first and the second skinning device is such that the carcass is clamped between the skinning devices.

7. The system according to claim 1, wherein the moving mechanism comprises at least one manipulation arm.

8. The device according to claim 1, wherein the moving mechanism comprises a rail structure to which the device for deskinning and/or defatting is slideable attached to.

9. A method for deskinning and/or defatting animal carcass while being conveyed by an overhang rails system comprising multiple of shackles carrying the carcass, the method comprising:
    sensing, by a sensing device, an incoming animal carcass,
    using the resulting sensing data from the sensing device by a control unit as a controlling data in controlling a movement of a first device while deskinning and/or defatting the carcass by the first device, where the controlled movement comprises:
    setting the first device to an initial angular position and engaging the skin and/or fat of the incoming animal carcass at an engaging position,
    moving the first device in a movement direction including a movement direction perpendicular to the conveying direction along the animal carcass while following an outer profile of the surface of the carcass and simultaneously adapting the angular position of the first device to the shape of the carcass so as to ensure a partial removal of the skin and/or fat.

10. The method according to claim 9, wherein the carcass has a pre-cut at an upper side of the carcass defining the engaging position, and where the moving direction perpendicular to the conveying direction is a direction downward from the pre-cut.

11. The method according to claim 9, wherein a second device for deskinning and/or defatting is provided for partial deskinning and/or defatting of the carcass simultaneous to the partial deskinning and/or defatting of the first device, where simultaneous to the first device, the controlled movement further includes:
    setting the second skinning device to an initial angular position and engaging the skin and/or fat of the incoming animal carcass at an engaging position,
    moving the second skinning device in a movement direction including a movement direction perpendicular to the conveying direction of the animal carcass while following an outer profile of the surface of the carcass while simultaneously adapting the angular position of the second skinning device to the outer shape of the carcass so as to ensure a partial removal of skin and/or fat, wherein the movement of the first and the second skinning device is continued while the internal distance between the first and the second skinning device is such that the carcass is clamped between the skinning devices during the deskinning and/or defatting.

12. The method according to claim 11, wherein the engaging position of the second device is at a same height level as the engaging position of the first device.

13. The method according to claim 11, wherein the engaging position of the second device is at a different height level as the engaging position of the first device.

14. The method according to claim 9, wherein subsequent to a first movement of the first and the second device, a subsequent movement of deskinning and/or defatting is performed on the carcass at a different angular position on the carcass.

15. The method according to claim 9, wherein the carcass is from a four-legged slaughtered animal.

* * * * *